(12) United States Patent
Kocherry et al.

(10) Patent No.: US 8,015,337 B2
(45) Date of Patent: Sep. 6, 2011

(54) POWER EFFICIENT INTERRUPT DETECTION

(75) Inventors: Mittu Xavier Kocherry, Cherry Hinton (GB); Simon John Craske, Cambridgeshire (GB); Chiloda Ashan Senerath Pathirane, Haverhill (GB); David Michael Gilday, Chatteris (GB)

(73) Assignee: ARM Limited, Cambridge (GB)

( * ) Notice: Subject to any disclaimer, the term of this patent is extended or adjusted under 35 U.S.C. 154(b) by 91 days.

(21) Appl. No.: 12/382,751

(22) Filed: Mar. 23, 2009

(65) Prior Publication Data

US 2010/0241777 A1   Sep. 23, 2010

(51) Int. Cl.
*G06F 13/24* (2006.01)
*G06F 1/00* (2006.01)

(52) U.S. Cl. .......... 710/262; 710/260; 710/267; 710/48; 713/300; 713/320; 713/324

(58) Field of Classification Search .................... 710/48, 710/262, 267; 713/300, 320, 324
See application file for complete search history.

(56) References Cited

U.S. PATENT DOCUMENTS

| | | | | |
|---|---|---|---|---|
| 5,918,057 A * | 6/1999 | Chou et al. | | 710/260 |
| 6,033,210 A * | 3/2000 | Freeman | | 431/291 |
| 7,328,295 B2 * | 2/2008 | Yiu et al. | | 710/264 |
| 7,350,005 B2 * | 3/2008 | Yiu et al. | | 710/264 |
| 2004/0199694 A1 * | 10/2004 | Yiu et al. | | 710/264 |
| 2004/0236879 A1 * | 11/2004 | Croxford et al. | | 710/48 |
| 2005/0138257 A1 * | 6/2005 | Burdass et al. | | 710/262 |

* cited by examiner

*Primary Examiner* — Brian T Misiura
(74) *Attorney, Agent, or Firm* — Nixon & Vanderhye P.C.

(57) ABSTRACT

Interrupt request detection circuitry is disclosed for detecting and outputting interrupt requests to a processor. The interrupt request detection circuitry comprises: an interrupt signal input for receiving an interrupt signal; an input for receiving a signal from the processor indicating whether the processor is currently processing an interrupt; a detection circuit for detecting an interrupt request and outputting an interrupt request signal to a data processing apparatus; disabling logic for disabling at least a portion of the detection circuitry; wherein in response to detecting the processor is currently processing an interrupt; the detection circuit is configured to detect a change in value of the interrupt signal caused by assertion of the interrupt signal indicating an interrupt request and to output an interrupt request signal to output circuitry in response to detecting the interrupt signal assertion; and in response to detecting the processor is not currently processing an interrupt; the disabling logic is configured to disable at least a portion of the detection circuit; and the detection circuit with the at least a portion disabled, is configured to output the interrupt signal as the interrupt request signal to the output circuitry.

15 Claims, 7 Drawing Sheets

POWER EFFICIENT INTERRUPT DETECTION

BACKGROUND OF THE INVENTION

1. Field of the Invention

The field of the invention relates to interrupts occurring during data processing and in particular, to detecting and transmitting interrupts to a processor.

2. Description of the Prior Art

Data processors which are operable to perform a plurality of functions are known. Generally, data processors that can run multiple functions have the ability to interrupt a function that is being processed at a particular moment and start processing a different higher priority one. This enables the latency associated with a high priority task to be reduced. In order to signal to the processor that a higher priority task is awaiting processing interrupt signals are used.

If a peripheral, for example, has a high priority task that it wishes the processor to perform it will send an interrupt signal to the processor to indicate to the processor that it has a task that it needs it to perform. If the core is processing an interruptible task, then it will take the interrupt and suspend processing of its current task and commence processing of the task specified by the interrupt. In order to notify the peripheral that it has taken the task, it will send a "taken" signal to the peripheral. When processing is complete, then it sends a "return" signal to the peripheral indicating that processing of the task is complete and that the interrupt has been dealt with and the processor then resumes processing the interrupted task. The peripheral issuing the interrupt will reset its interrupt request signal once it has detected that the interrupt has been taken and the core is dealing with its request. Clearly this resetting of the signal will not be immediate as it takes time both for the processor to send the taken signal and for the peripheral to react to it.

When processing interrupts, it is important that while the interrupt is being processed by the core, any new interrupts received are detected. The interrupt signal having an asserted value IRQ is not necessarily an indication of a new interrupt being received as it may simply mean that the interrupt request currently being processed has not yet been reset. Thus, while the core is processing an interrupt, it is changes in the interrupt signal IRQ that are important and signal a new interrupt to be processed, not the value of the IRQ signal itself. In other words, deassertion and then reassertion of this signal need to be detected to indicate that an interrupt is to be processed.

When an interrupt is not currently being processed by the core, then it is the value of this signal, i.e. its level that is important and indicates whether there is an interrupt to be processed or not.

FIG. 1 shows an interrupt detection circuit according to the prior art. In this circuit an interrupt request signal IRQ is received and is passed through a flip flop 10. Flip flop 10 acts to delay the signal by a clock cycle. The value output by flip flop 10 is then compared to the input interrupt request signal IRQ received and if there is a difference in the signals, this indicates that there has been a change in value in the interrupt request signal during the last clock signal and in response to this the signal IRQ-pend indicating that there is an interrupt request pending is asserted.

There is also a level signal input to this circuit and this is used to indicate when it is the level of the signal that it is important to detect rather than a change in its value. In this embodiment when the level signal is set to 1, IRQ is output as IRQ-pend via output flip flop 20. When level is set to 0 the delayed value of IRQ is compared with the current value of IRQ and thus, changes in the value are detected.

Conventional interrupt detecting circuits such as that shown in FIG. 1 are able to detect both edges and levels of a signal so as to provide the core with suitable interrupt requests.

SUMMARY OF THE INVENTION

A first aspect of the present invention provides interrupt request detection circuitry for detecting and outputting interrupt requests to a processor comprising: an interrupt signal input for receiving an interrupt signal; an input for receiving a signal from said processor indicating whether said processor is currently processing an interrupt; a detection circuit for detecting an interrupt request and outputting an interrupt request signal to said processor; disabling logic for disabling at least a portion of said detection circuitry; wherein in response to detecting said processor is currently processing an interrupt; said detection circuit is configured to detect a change in value of said interrupt signal caused by assertion of said interrupt signal indicating an interrupt request and to output an interrupt request signal to output circuitry in response to detecting said interrupt signal assertion; and in response to detecting said processor is not currently processing an interrupt; said disabling logic is configured to disable at least a portion of said detection circuit; and said detection circuit with said at least a portion disabled, is configured to output said interrupt signal as said interrupt request signal to said output circuitry.

The present invention recognises that while the core is processing data and not processing an interrupt then the interrupt signal IRQ itself is sufficient to indicate to the core whether or not there is a pending interrupt that needs to be taken. However, when it is processing an interrupt it is an assertion of the interrupt signal, that is an edge in the signal, that needs to be detected in order to detect whether or not there is an interrupt pending that needs to be processed. In addition it realises that for much of the time the processor will not be processing an interrupt and that detection of change in a signal value or an edge is more difficult and thus, requires more circuitry than detection of a signal value or level.

Having recognised these things, the present invention provides disabling logic that is responsive to signals from the core indicating that it is currently not processing an interrupt to disable part of the interrupt signal detection circuit at this time. This circuit is arranged such that when a part of it is disabled it simply outputs the received interrupt signal, which is sufficient at this time to indicate if an interrupt request needs to be taken or not. In this way much of the detection circuit that is required for detecting edges can be powered down for much of the time, resulting in significant power savings.

In some embodiments, said input for receiving a signal from said processor is arranged to receive a taken signal indicating said processor is commencing processing of said interrupt and a return signal indicating said processor has completed processing of said interrupt, and said disabling logic is configured to disable said at least a portion of said detection circuit in response to receipt of said return signal and to enable said at least a portion of said detection circuit in response to receipt of said taken signal.

Although, the signal from the processor indicating whether the processor is currently processing an interrupt can take a number of forms, in some embodiments it comprises two signals, a taken signal which indicates that the processor is commencing processing of the interrupt and a return signal indicating that the processor has completed processing of the interrupt. This is the important information that the interrupt detection circuitry needs to know and thus, it is convenient if this information is available. If the signals are sent in this form, then the disabling logic can react to these signals to disable the at least a portion of the detection circuit when the data processing processor is not processing the interrupt.

In some embodiments, said interrupt detection circuitry comprises logic for deasserting said interrupt request signal output by said output circuitry in response to detecting said taken signal.

As noted previously, it may take some time for the interrupt request to be deasserted as the device sending this request may take time to realise that it is actually being processed by the processor. Thus, in some embodiments the interrupt detection circuitry deasserts the interrupt request signal when it realises that the processor has commenced processing the interrupt. In this way, the interrupt request that is being processed is no longer asserted at the processor and it cannot mistakenly believe that it needs to take a further interrupt when it has already taken this interrupt. Thus, the delays for this signal to be deasserted do not affect the operation of the system.

In some embodiments, said detection circuit comprises mask signal generation logic, said mask signal generation logic being arranged to receive said interrupt signal and said taken signal, said mask signal generation logic being configured to: output an asserted mask signal in response to said taken signal; and output a deasserted mask signal in response to detection of said interrupt signal being deasserted; said detection circuit further comprising masking logic to mask said interrupt signal in response to said mask signal being asserted such that said mask signal is output to output circuitry and not to mask said interrupt signal in response to said mask signal not being asserted such that said interrupt signal is output to said output circuitry.

As noted previously, it may take some time for the interrupt signal to be deasserted even though the processing apparatus is processing the interrupt. Thus, in some embodiments, a mask signal is generated to mask the interrupt signal once the processing apparatus starts to process the interrupt. In order for the device to be able to detect a subsequent interrupt, this mask signal is deasserted if the interrupt is deasserted and in this way a subsequent interrupt signal will be detected as it will not be masked.

In some embodiments, said detection circuit further comprises a clocked flip flop for receiving said mask signal from said mask signal generation logic and for outputting said mask signal to said masking logic, said disabling logic comprising a clock gating circuit for gating a clock signal for clocking said flip flop, such that when gated said flip flop does not output said asserted mask signal and said interrupt signal is not masked.

A clocked flip flop is a convenient way of providing the mask signal to the masking logic. However, clocked flip flops consume quite a lot of power and thus, it is advantageous if the disabling logic can gate the clock to this flip flop and thereby save significant power when this flip flop is not required, i.e. when an interrupt is not currently being processed.

In some embodiments, said mask signal generation logic is configured to deassert said mask signal in response to receipt of said return signal.

Although, in some embodiments the flip flop outputting the mask signal is disabled in response to the return signal and thus, no mask signal is output, in other embodiments this may not be the case. For example, if the disabling logic is responsive to other interrupts being handled this portion of the circuit may not be disabled because the processor is still handling an interrupt from another detection circuit. In such a case, it is still important that an interrupt is not masked when the interrupt handler is not active for this particular interrupt and thus, it is convenient if the return signal deasserts the mask signal itself, rather than relying on disabling of the flip flop to do it.

In some embodiments, said output circuitry comprises a clocked flip flop.

In some embodiments, the interrupt detection circuitry further comprises a plurality of interrupt signal inputs for receiving a plurality of interrupt signals; a plurality of detection circuits for detecting a corresponding plurality of interrupt requests and outputting a plurality of interrupt request signals to a data processing apparatus; wherein in response to detecting said data processing apparatus is not currently processing an interrupt: said disabling logic is configured to disable at least a portion of said plurality of detection circuits; and said plurality of detection circuits with said at least a portion disabled, are configured to output said plurality of interrupt signals as said plurality of interrupt request signals to said output circuitry.

In some embodiments a plurality of interrupts are processed and each has its own detection circuit. In such a case, it may be convenient for the disabling logic to disable the at least a portion of the detection circuit of all of the detection circuits. In this case if the processor is handling any of the interrupts then none of the detection circuitry is disabled. However, when the processor is not processing any interrupts then all of the plurality of detection circuits can have the relevant portion of their detection circuit disabled. This is a convenient way of saving energy as often the processor is not processing any interrupts and thus, for much of the time the portions of the circuits are disabled, while the amount of logic required to do this is small as all of the circuit portions are controlled together.

A second aspect of the present invention provides interrupt detection circuitry according to a first aspect of the present invention a processor for processing data; interrupt handler logic for handling interrupt requests received from said interrupt detection circuitry; said processor being configured to transmit a signal to said interrupt detection circuitry indicating whether said interrupt handler logic is currently processing an interrupt or not.

In some embodiments, said processor is configured to transmit a taken signal to said interrupt detection circuitry indicating that said interrupt handler logic is commencing processing of an interrupt and to transmit a return signal indicating that said interrupt handler logic has completed processing of said interrupt, and said processor is configured to deassert said interrupt signal before transmission of said return signal.

A third aspect of the present invention provides a method of delivering an interrupt to a processor comprising the steps of: receiving an interrupt signal; detecting whether said processor is currently processing an interrupt or not; if said processor is currently processing an interrupt, detecting a change in value of said interrupt signal indicating assertion of said interrupt signal and outputting any detected assertion as an interrupt request signal to output circuitry using a detection circuit; if said processor is not currently processing an interrupt, disabling at least a portion of said detection circuit and outputting said interrupt signal as said interrupt request signal to said output circuitry.

A fourth aspect of the present invention provides interrupt request detection circuitry for detecting and outputting interrupt requests to a processor comprising: an interrupt signal input for receiving an interrupt signal; an input for receiving a signal from said processor indicating whether said processor is currently processing an interrupt; a detection circuit for detecting an interrupt request and outputting an interrupt request signal to a processor; disabling logic for disabling at least a portion of said detection circuitry; wherein in response to detecting said processor is currently processing an interrupt; said detection circuit is configured to detect edges in said interrupt signal such that assertion of said signal is detected and in response to detection of assertion of said interrupt signal an interrupt request signal is output to output circuitry; and in response to detecting said processor is not currently processing an interrupt; said disabling logic is configured to disable at least a portion of said detection circuit; and said detection circuit with said at least a portion disabled, is configured to output said interrupt signal as said interrupt request signal to said output circuitry.

In some embodiments, said detection circuit comprises: delay circuitry for delaying said received interrupt signal; comparison circuitry for comparing said delayed interrupt signal with said received interrupt signal to determine said assertion of said interrupt signal; and wherein said disabling logic is responsive to detecting that said data processing apparatus is not currently processing an interrupt to disable said delay circuitry.

One way of detecting a change in a signal value is to compare it with a previous value, using delay circuitry. Thus, in some embodiments, when a change in value is to be detected delay circuitry is used to delay the signal so that the current value can be compared with a previous value. When it is the level that is important then this delay circuitry is not required and can be disabled.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
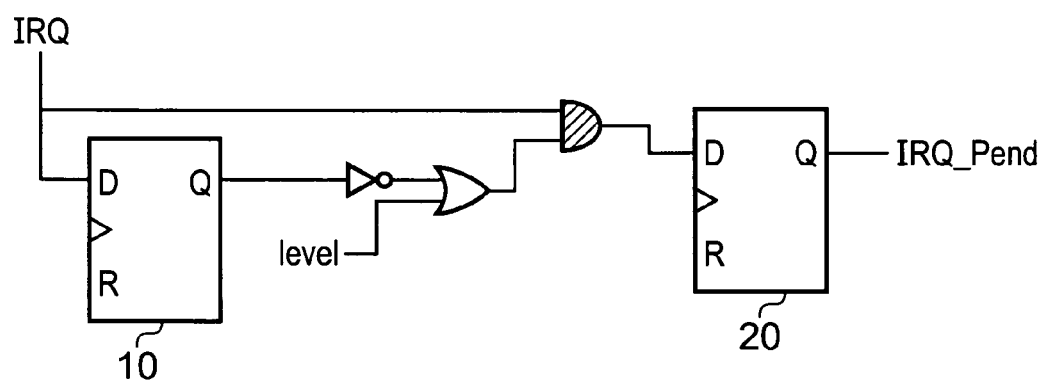
FIG. 1 shows an interrupt detection circuit according to the prior art.
Figure 2:
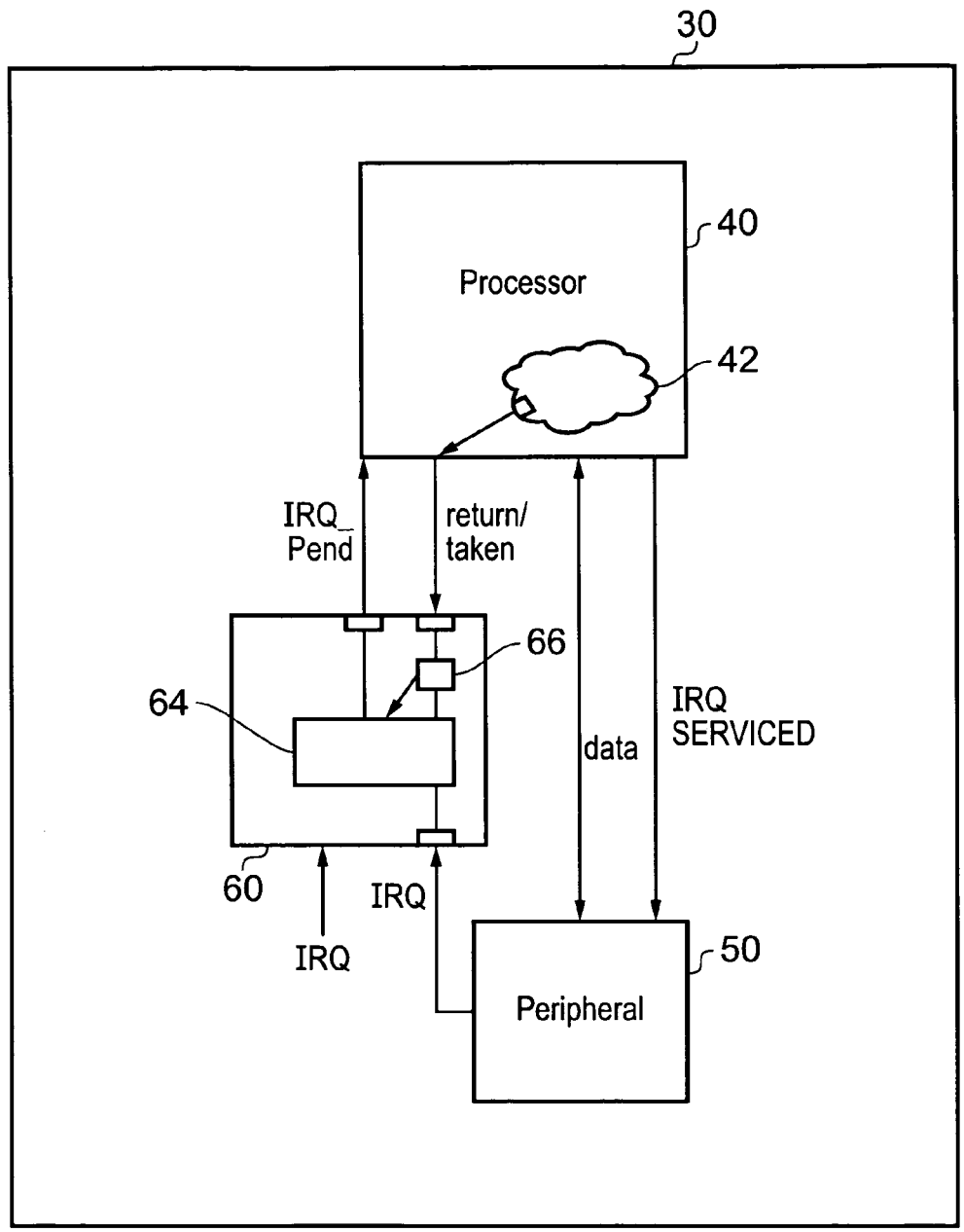
FIG. 2 shows a data processing apparatus having an interrupt detection circuit according to an embodiment of the present invention.

FIG. 2 shows a data processing apparatus 30 comprising a processing core 40, a peripheral 50 and interrupt detection circuitry 60. Although in this embodiment only one peripheral is shown it will be clear to a skilled person that in fact there may be several peripherals. Peripheral 50 communicates with the core and if it has a task it needs the processor 40 to perform it indicates this by sending an interrupt signal. The interrupt signal is sent via interrupt detection circuitry 60 which acts as an interrupt controller to control interrupt signals it receives from different peripherals and to send them as interrupt requests IRQ-pend to core 40. Core 40 processes interrupts using interrupt handler logic 42 for controlling the processing of these different processes. In this embodiment the interrupt handler logic is in the form of software.

In addition to receiving interrupt signals IRQ from peripheral 50 and from other peripherals not shown, interrupt detection circuitry 60 also receives signals from core 40 indicating whether it is currently processing an interrupt or not. These signals are in the form of return and taken signals that indicate that a requested interrupt has been taken and that processing of this interrupt has completed (return). When an interrupt is taken this is signalled by the taken signal and the interrupt handler logic within the core commences processing of the interrupt. When processing of the interrupt is complete then a return signal is sent from the core to the interrupt detection circuitry 60.

Interrupt detection circuitry 60 has an interrupt detector 64 for detecting an interrupt request. Thus, the interrupt signal IRQ from peripheral 50 is sent to the detector 64. The return and taken signals from the core are also sent via disabling logic 66 to the interrupt detector 64. Disabling logic 66 acts to disable a portion of the detector 64 in response to the return signal and to enable this portion of the circuit in response to the taken signal. When the whole of detector 64 is enabled the core is currently processing an interrupt and detector 64 detects assertion of the interrupt signal IRQ. In other words, rather than detecting the value of this signal it detects a rising edge of it, or if negative logic is being used a falling edge, and in response to detecting assertion of this signal it outputs an IRQ-pend request to the core. This is important as when the core is processing an interrupt the fact that the IRQ signal is asserted may simply mean that the core has not yet reset this signal even though it is currently processing the interrupt. The IRQ signal is deasserted in response to the peripheral that sent the IRQ signal detecting that the core has taken the interrupt, this may be done, for example, by the core setting a value in memory that the peripheral reads. In any case, it will take some time, and thus, the fact that the IRQ signal is still asserted following the "taken" signal being received does not mean that there is an interrupt pending. However, once it has been deasserted, if it is asserted again then this needs to be captured as this does indeed signal a subsequent interrupt that needs to be processed. Thus, during processing of an interrupt via the core it is important that assertion of the interrupt signal is detected. It will, however, be deasserted some time during the processing of the interrupt and thus, once the return signal is received an IRQ signal having an asserted value does indicate a pending interrupt.

When the processor core is not processing an interrupt then disabling logic 66 disables a portion of the detector 64. This results in a power saving and means that a portion of the circuit is not operational. In this case, rather than detecting an assertion of the interrupt signal, the detect circuit simply detects the interrupt signal and outputs it as it is. This is acceptable, as if the interrupt signal is asserted then when the processor is not currently processing an interrupt this signal indicates that an interrupt is requested and thus, in response to this an interrupt request signal IRQ-pend is sent to the core.

Figure 3:
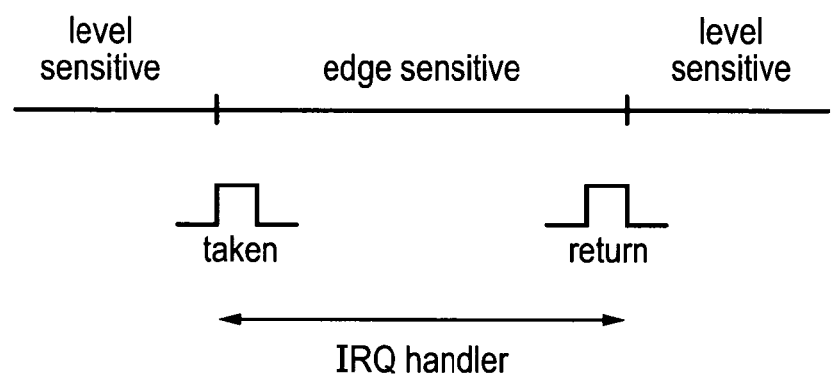
FIG. 3 shows required sensitivities of an interrupt detection circuit according to an embodiment of the present invention when an interrupt is being processed and when it is not.

FIG. 3 shows in diagrammatic form the sensitivity required by detection circuit 60 depending on the state of the core. Thus, when the core is processing data the detection circuit 60 can simply detect the level of the interrupt signal and output an interrupt request IRQ-pend in response to this. However, when the core is processing an interrupt using interrupt handling logic then the detect circuit must be edge sensitive in order to detect assertion of the interrupt signal.

Figure 4:
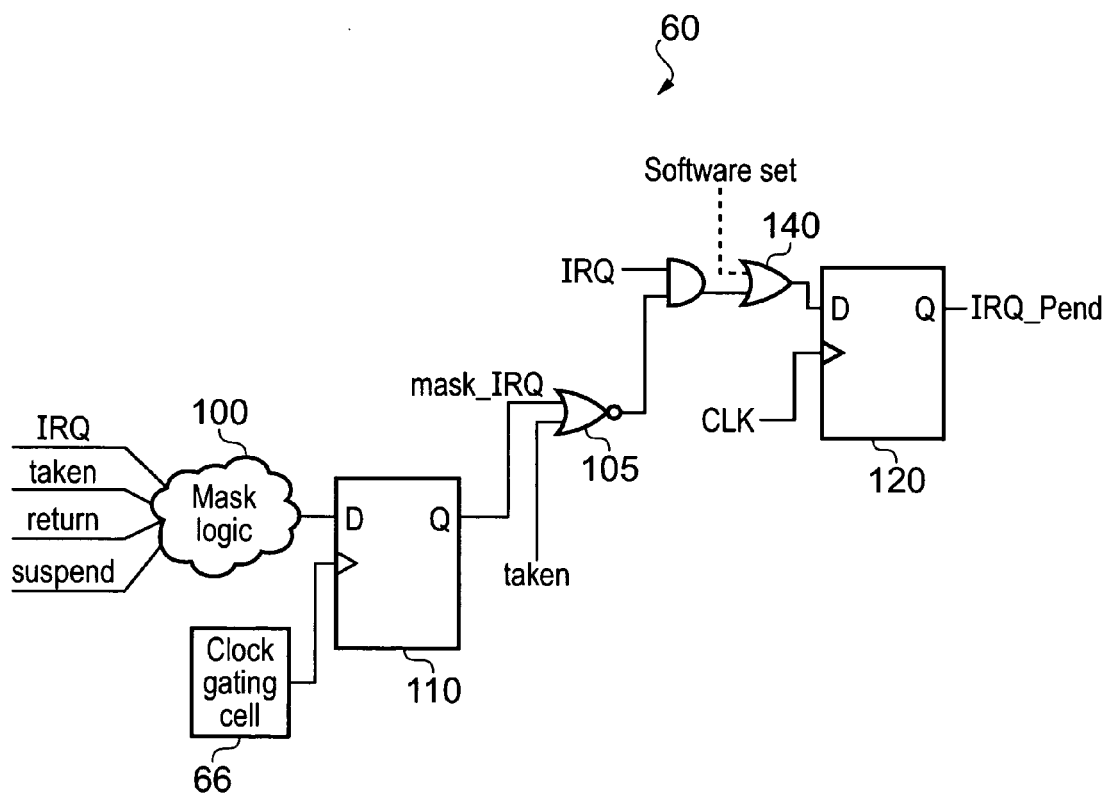
FIG. 4 shows an interrupt detection circuit according to an embodiment of the present invention.

FIG. 4 shows an embodiment of interrupt detection circuitry 60 in greater detail. This circuit comprises mask generation logic 100 which receives an interrupt signal IRQ from a peripheral and receives taken and return signals from the processor indicating whether it is currently processing an interrupt or not. It also receives other signals such as a software interrupt signal. Mask generation logic 100 is configured to generate a mask signal in response to the "taken" signal indicating that the processor core has commenced processing of the interrupt. This mask signal passes through flip flop 110 and acts to mask the interrupt signal IRQ that the processor is now processing. This mask signal masks the interrupt signal IRQ and thus, the IRQ_PEND which is the interrupt request signal sent to the core is not asserted when the mask signal is asserted. It should be noted that the "taken" signal is also input to NOR gate 105 and this is done to mask the interrupt signal almost immediately in response to the "taken" signal and avoid the interrupt signal not being masked during the time it takes for the mask generation logic to generate a mask signal and pass it through flip flop 110.

Thus, when the interrupt handler is processing an interrupt the interrupt request signal to the core is masked by the mask signal. Mask generation logic 100 is responsive to the IRQ signal falling to deassert the mask signal and in response to this the interrupt signal is no longer masked and thus, the now deasserted IRQ signal is output at output circuitry 120. If the interrupt signal is then asserted, as the mask signal is low this is not masked and this signal is sent as an interrupt request to the core. In this way, this circuit is able to detect assertion of the interrupt signal while the interrupt handler is handling an interrupt and yet mask a previously asserted interrupt signal at the beginning of this process. When the interrupt handler is not active, i.e. following receipt of a "return" signal then clock gating cell 66 becomes active and this gates the clock to flip flop 110, thereby disabling this circuit. When this is gated there is no mask signal output and thus, it is the interrupt signal IRQ that is output to output circuitry 120 and this forms the interrupt request signal IRQ_PEND that is sent to core 40.

There is also provision as can be seen for adding a software interrupt to the interrupt detection circuitry. This is an interrupt that can be set by software and is not maskable, being input to OR gate 140.

Figure 5:
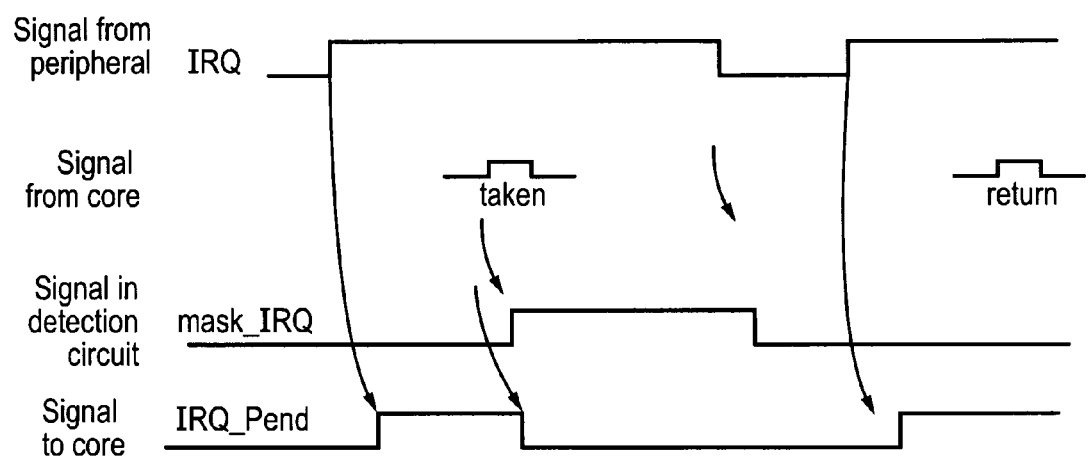
FIG. 5 shows a timing diagram for the interrupt detection circuit of FIG. 4.

FIG. 5 shows a timing diagram illustrating timing of the signals processed by the circuit of FIG. 4. As can be seen an interrupt signal IRQ is received from a peripheral. This is sent as an IRQ_pend signal to the core. When this is accepted for processing by processor 40 a "taken" signal is sent and in response to this a mask signal mask_IRQ is generated. This mask signal acts to mask the IRQ signal sent to the core, i.e. IRQ_pend is deasserted in response to this signal. When IRQ is later deasserted then the mask_IRQ signal is deasserted in response to this and IRQ_pend now outputs the IRQ signal, which is deasserted. When IRQ is next asserted, this is reflected by IRQ_pend which is itself asserted in response to this.

Although in this timing diagram it is not shown as the mask signal is already deasserted, if the mask signal were still to be asserted when the "return" signal was received, as would occur if IRQ was not deasserted while the processor was handling the interrupt, then the mask signal is cleared by the return signal, so that then when the processor is not handling an interrupt the mask value is not generated and the interrupt signal is not masked.

Figure 6:
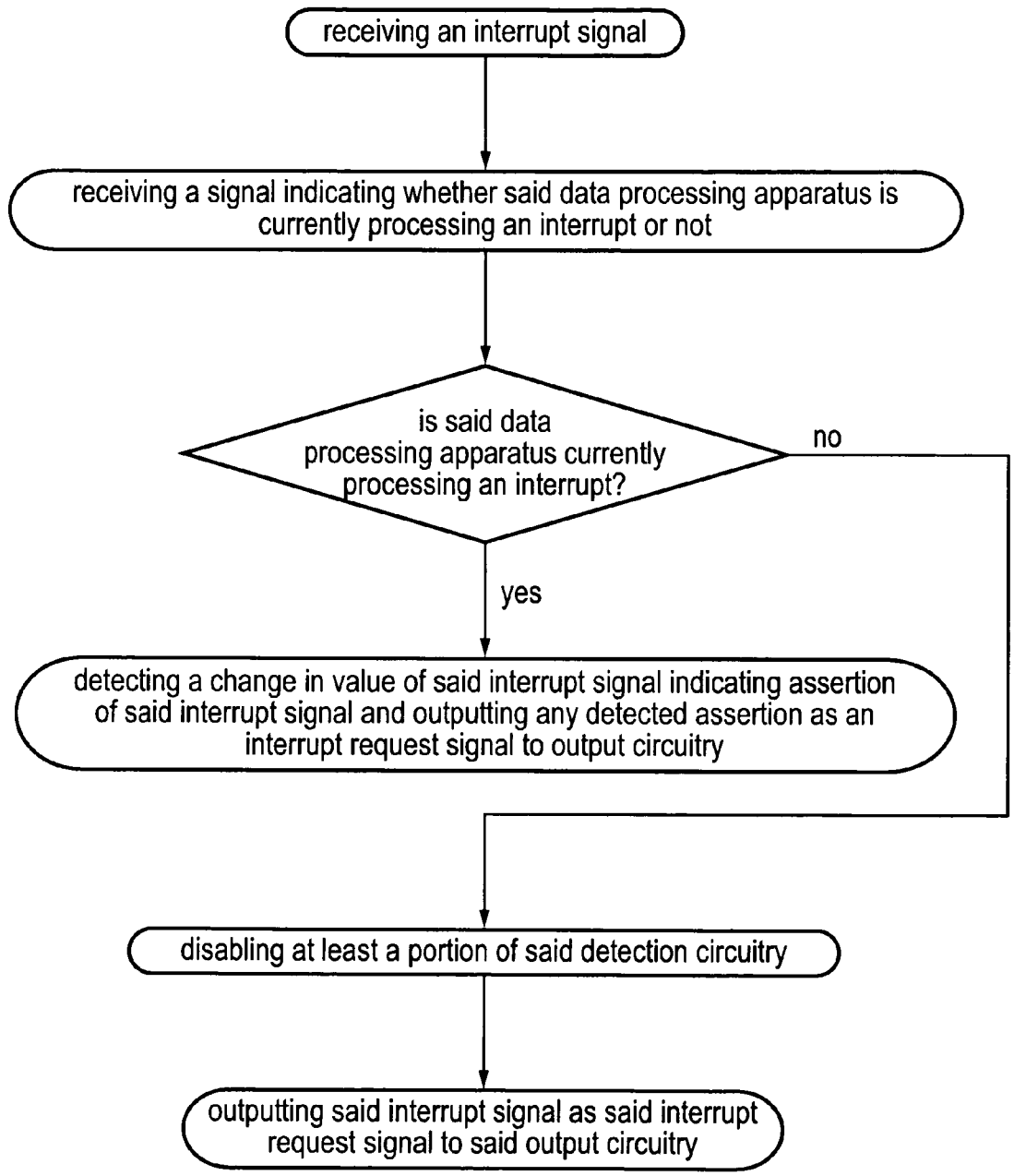
FIG. 6 shows a flow diagram illustrating steps in a method according to an embodiment of the present invention.

FIG. 6 shows a flow diagram illustrating a method according to embodiment of the present invention. An interrupt signal is first received along with a signal indicating whether the data processing apparatus is currently processing an interrupt or not. If the data processing apparatus is currently processing an interrupt then the method detects a change in value of the interrupt signal which would indicate assertion of this signal and outputs any detected assertion as an interrupt request signal to output circuitry which is then forwarded to the core.

If it is detected that the data processing apparatus is not currently processing an interrupt then at least a portion of the detection circuitry is disabled and rather than detecting assertion of the interrupt signal, the interrupt signal itself is output as the interrupt request signal to the output circuitry.

Figure 7:
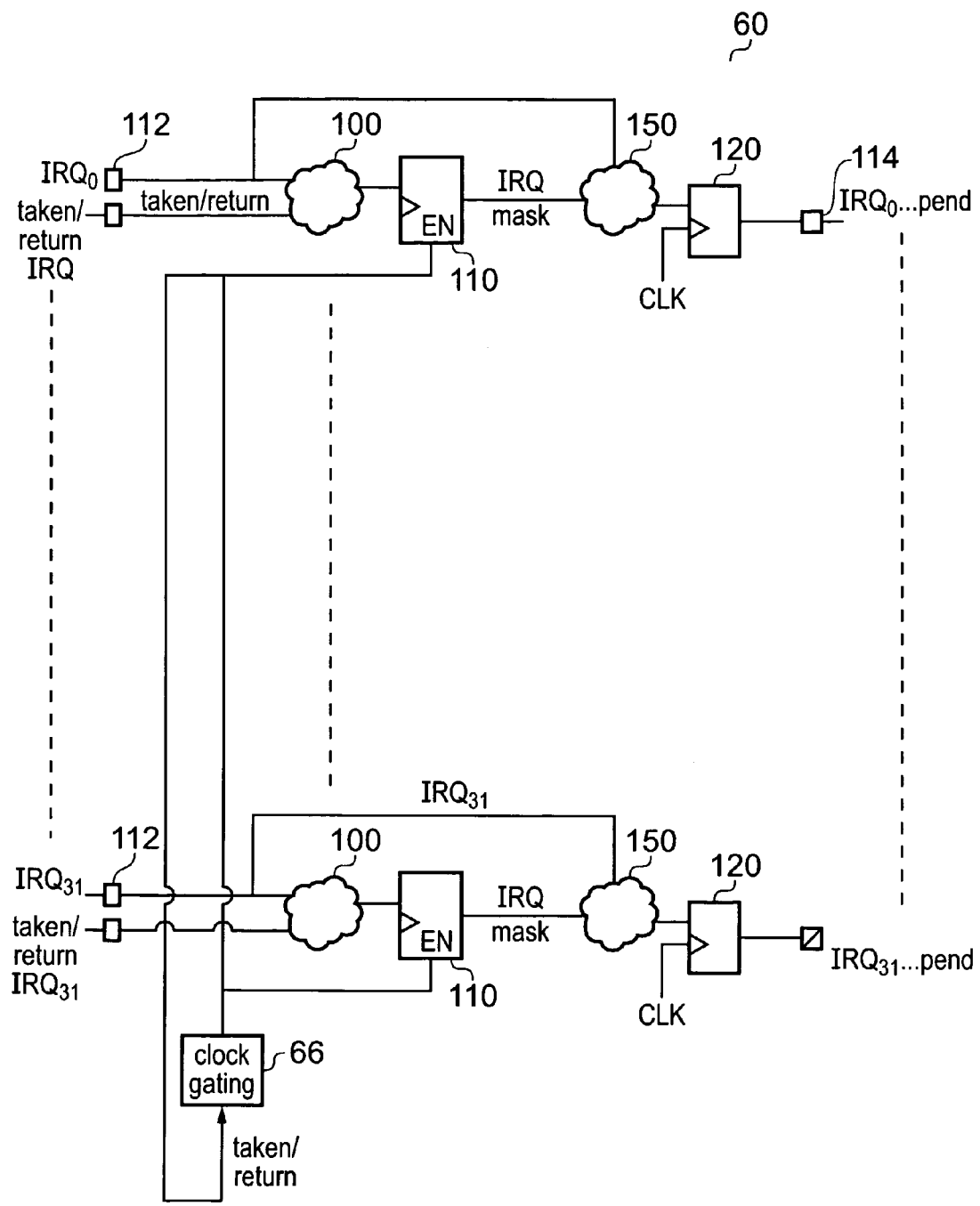
FIG. 7 shows interrupt detection circuitry according to a further embodiment of the present invention.

FIG. 7 shows interrupt detection circuitry 60 accordingly to a further embodiment of the present invention. Interrupt detection circuitry 60 receives a plurality of interrupts, in this case 32 interrupts $IRQ_0$ to $IRQ_{31}$ and outputs a corresponding plurality, 32, interrupt request signals $IRQ_0\_pend$ to $IRQ_{31}\_pend$. The interrupt signals are received at inputs 112 and are each sent to their own detection circuitry where receipt of these interrupts is detected and in response to this interrupt request signals are output via outputs 114. The individual detection circuitry each comprise mask generation logic 100 for generating a mask signal to mask their respective received interrupts when the processor is processing this interrupt, i.e. in response to receiving a "taken" signal from the processor. This mask signal is then deasserted in response to detection of the interrupt signal IRQ itself being deasserted. Thus, as in the circuit of FIG. 4, this circuit can detect assertion of the interrupt signal using the mask generation logic. As the mask signal is generated in response to the "taken" signal indicating that the processor is commencing processing of the interrupt and the mask signal is cleared by the return signal then when the processor is not handling an interrupt the mask value is not generated and the interrupt signal is not masked.

In this embodiment, there is disabling logic which is in the form of clock gating circuitry 66 and is responsive to the "taken" and "return" signals from all of the interrupts to detect if the processor is currently processing any of them. If it is then the clock gating circuit does not gate any of the clocks and each of the flip flops 110 are enabled. However, if no interrupts are currently being processed by the processor, which even though there are 32 interrupts occurs quite often, then all of the flip flops 110 are disabled which results in the mask signal not being asserted and thus, the interrupt signals themselves being output as the interrupt request signals. It should be noted that by clock gating all of the flip flops in all of the detection circuits together, so that they are only gated when the processor is not processing any interrupts, there are times when these flip flops are active although they are not needed. However, there is only one clock gating circuit required to gate all of the flip flops and it has been found that the disadvantage due to power consumption of some of the flip flops being active when they are not needed is more than offset by the area gained by not having additional clock gating logic for each flip flop. It will be clear to a skilled person that in some embodiments there may be more than one clock gating circuit, with each clock gating circuit controlling gating of a subset of the detection circuits, the optimal number depending on the circuitry and the number of interrupts received.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. Interrupt detection circuitry for detecting and outputting interrupt requests to a processor, said circuitry comprising:
   an interrupt signal input for receiving said interrupt requests;
   output circuitry for outputting said interrupt requests to said processor;
   a detection circuit, responsive to said processor indicating current processing of an interrupt in response to one of said interrupt requests, for detecting a change in value of a signal received at said interrupt request input caused by assertion of another interrupt request and for outputting said another interrupt request to said output circuitry; and
   disabling logic, responsive to said processor not currently processing said interrupt, for disabling at least a portion of said detection circuitry, said detection circuit with said at least a portion disabled, is configured to output said signal received at said interrupt request input as said interrupt request to said output circuitry, wherein said processor provides a taken signal indicating said processor is commencing processing of said interrupt and a return signal indicating said processor has completed processing of said interrupt, and said disabling logic is configured to disable said at least a portion of said detection circuit in response to receipt of said return signal and to enable said at least a portion of said detection circuit in response to receipt of said taken signal.

2. Interrupt detection circuitry according to claim 1, wherein said interrupt detection circuitry comprises logic for deasserting said interrupt request output by said output circuitry in response to detecting said taken signal.

3. Interrupt detection circuitry according to claim 1, said detection circuit comprising mask signal generation logic, said mask signal generation logic being arranged to receive said interrupt request and said taken signal, said mask signal generation logic being configured to:
   output an asserted mask signal in response to said taken signal; and
   output a deasserted mask signal in response to detection of said interrupt request being deasserted;
   said detection circuit further comprising masking logic to mask said interrupt request in response to said mask signal being asserted such that said mask signal is output to output circuitry and not to mask said interrupt request in response to said mask signal not being asserted such that said interrupt request is output to said output circuitry.

4. Interrupt detection circuitry according to claim 3, said detection circuit further comprising a clocked flip flop for receiving said mask signal from said mask signal generation logic and for outputting said mask signal to said masking logic,
   said disabling logic comprising a clock gating circuit for gating a clock signal for clocking said flip flop, such that when gated said flip flop does not output said asserted mask signal and said interrupt request is not masked.

5. Interrupt detection circuitry according to claim 3, wherein said mask signal generation logic is configured to deassert said mask signal in response to receipt of said return signal.

6. Interrupt detection circuitry according to claim 1, wherein said output circuitry comprises a clocked flip flop.

7. Interrupt detection circuitry according to claim 1, further comprising:
   a plurality of interrupt request inputs for receiving a plurality of interrupt requests;
   a plurality of detection circuits for detecting a corresponding plurality of interrupt requests and outputting a plurality of interrupt requests to a data processing apparatus; wherein
   in response to detecting said data processing apparatus is not currently processing said interrupt;
   said disabling logic is configured to disable at least a portion of said plurality of detection circuits; and
   said plurality of detection circuits with said at least a portion disabled, are configured to output said plurality of signals received at said plurality of interrupt signal inputs as said plurality of interrupt requests to said output circuitry.

8. A data processing apparatus comprising:
   a processor for processing data;
   an interrupt signal input for receiving interrupt requests;
   interrupt detection circuitry for detecting and outputting interrupt requests to said processor, said circuitry comprising:
   output circuitry for outputting said interrupt requests to said processor;
   a detection circuit, responsive to said processor indicating current processing of an interrupt in response to one of said interrupt requests, for detecting a change in value of a signal received at said interrupt request caused by assertion of another interrupt request and for outputting an interrupt request to said output circuitry; and
   disabling logic, responsive to said processor not currently processing said interrupt, for disabling at least a portion of said detection circuitry, said detection circuit with said at least a portion disabled, is configured to output said signal received at said interrupt request input as said interrupt request to said output circuitry;
   interrupt handler logic for handling interrupt requests received from said interrupt detection circuitry;
   said processor being configured to transmit a signal to said interrupt detection circuitry indicating whether said interrupt handler logic is currently processing an interrupt in response to one of said interrupt requests or not, wherein said processor is configured to transmit a taken signal to said interrupt detection circuitry indicating that said interrupt handler logic is commencing processing of said interrupt and to transmit a return signal indicating that said interrupt handler logic has completed processing of said interrupt, and said processor is configured to deassert said interrupt request before transmission of said return signal.

9. A method of delivering interrupt requests to a processor, said method comprising the steps of:
   detecting whether said processor is currently processing an interrupt in response to one of said interrupt requests or not;
   if said processor is currently processing said interrupt, detecting a change in value of a signal received at an interrupt request input indicating assertion of another interrupt request using a detection circuit and outputting said another interrupt request to output circuitry;
   if said processor is not currently processing said interrupt, disabling at least a portion of said detection circuit and outputting said signal received at said interrupt request input as said interrupt request to said output circuitry, wherein said step of detecting whether or not said processor is currently processing said interrupt comprises monitoring an input for receiving signals from said processor, said signals comprising a taken signal indicating said processor is commencing processing of said interrupt and a return signal indicating said processor has completed processing of said interrupt, said method comprises the further steps in response to receipt of said taken signal:

outputting an asserted mask signal;

in response to detection of said at least one interrupt request being deasserted, outputting a deasserted mask signal, and in response to said mask signal being asserted, masking said at least one interrupt request such that said mask signal is output to output circuitry; and in response to said mask signal not being asserted, not masking said interrupt request such that said interrupt request is output to said output circuitry.

10. A method according to claim 9, wherein said method comprises the further step of deasserting said interrupt request signal output by said output circuitry in response to detecting said taken signal.

11. A method according to claim 9, wherein said detection circuit further comprises a clocked flip flop for receiving and outputting said mask signal, and said disabling step comprises gating a clock signal for clocking said flip flop, such that when gated said flip flop does not output said asserted mask signal and said interrupt request is not masked.

12. A method according to claim 11, comprising a further step of:

in response to detecting assertion of said interrupt request following deassertion of said interrupt request, reasserting said mask signal, and outputting said reasserted mask signal to said clocked flip flop.

13. A method according to claim 11, wherein the step of receiving an interrupt request comprises receiving a plurality of interrupt requests;

the step of detecting whether said processor is currently processing said interrupt comprises detecting whether said processor is currently processing any one of a plurality of interrupts, each interrupt processed in response to receipt of a corresponding one of said plurality of interrupt requests;

if said processor is currently processing any of said plurality of interrupts, the step of detecting a change in value of said signal received at said interrupt request input is performed using a plurality of detection circuits each arranged for detecting a corresponding one of said plurality of interrupt requests;

in response to detecting said data processing apparatus is not currently processing any of said plurality of interrupts the step of disabling at least a portion of said detection circuit comprises disabling at least a portion of each of said plurality of detection circuits.

14. Interrupt detection circuitry for detecting and outputting interrupt request to a processor, said circuitry comprising:

an interrupt request input for receiving said interrupt requests;

output circuitry for outputting said interrupt requests to said processor;

a detection circuit, responsive to said processor indicating current processing of an interrupt in response to one of said interrupt requests, for detecting a change in value of a signal received at said interrupt request input caused by assertion of another interrupt request and for outputting said another interrupt request to said output circuitry; and disabling logic, responsive to said processor not currently processing said interrupt, for disabling at least a portion of said detection circuitry, said detection circuit with said at least a portion disabled, is configured to output said signal received at said interrupt request input as said interrupt request to said output circuitry, wherein said detection circuit comprises mask generating logic for generating an asserted mask signal in response to detecting said processor is commencing processing of said interrupt and for deasserting said asserted mask signal in response to detecting said one of said interrupt requests is deasserted, said detection circuit further comprising masking logic for masking said interrupt request and outputting said mask signal to said output circuitry in response to said asserted mask signal and for outputting said interrupt request to said output circuitry in response to said mask signal being deasserted; and wherein said disabling logic is configured to disable said mask generation logic such that no asserted mask signal is generated when said processor is not processing said interrupt.

15. Interrupt detection circuitry according to claim 14, wherein said detection circuitry comprises:

delay circuitry for delaying one of said interrupt requests received at said interrupt request input;

comparison circuitry for comparing said delayed interrupt request with said received interrupt request to determine said assertion of said interrupt request; and wherein said disabling logic is responsive to detecting that said data processing apparatus is not currently processing said interrupt request to disable said delay circuitry.

* * * * *